United States Patent [19]
Flesher et al.

[11] Patent Number: 4,940,763
[45] Date of Patent: Jul. 10, 1990

[54] WATER SOLUBLE POLYMERS

[75] Inventors: Peter Flesher, Bingley; David Farrar, Bradford; Malcolm Hawe, Huddersfield; John Langley, Shipley, all of England

[73] Assignee: Allied Colloids Limited, United Kingdom

[21] Appl. No.: 113,599

[22] Filed: Oct. 26, 1987

Related U.S. Application Data

[63] Continuation-in-part of Ser. No. 766,097, Aug. 15, 1985, Pat. No. 4,702,844.

[30] Foreign Application Priority Data

| Aug. 15, 1984 | [GB] | United Kingdom | 8420693 |
| Aug. 15, 1984 | [GB] | United Kingdom | 8420694 |
| Aug. 15, 1984 | [GB] | United Kingdom | 8420695 |
| Feb. 12, 1985 | [GB] | United Kingdom | 8520218 |

[51] Int. Cl.$^5$ ............................................. C08F 20/60
[52] U.S. Cl. .................. 526/307; 526/292.2; 526/312
[58] Field of Search ............ 526/307, 312, 292.2

[56] References Cited

U.S. PATENT DOCUMENTS

| 3,520,970 | 7/1970 | Lehmann et al. | 526/312 |
| 3,678,098 | 7/1972 | Lewis et al. | 526/312 |
| 4,396,752 | 8/1983 | Cabestony et al. | 526/312 |

FOREIGN PATENT DOCUMENTS

| 5212240 | 1/1977 | Japan | 526/312 |
| 5342284 | 4/1978 | Japan | 526/312 |

*Primary Examiner*—Joseph L. Schofer
*Assistant Examiner*—N. Sarofin
*Attorney, Agent, or Firm*—Andrus, Sceales, Starke & Sawall

[57] ABSTRACT

Water soluble, substantially linear, polymers having single point intrinsic viscosity above about 3 are formed from an ethylenically unsaturated monomer that includes a group —$B_nA_mR$ where A is propoxy or butoxy, B is ethoxy, n is zero or an integer of 2 to 100 and m is zero or an integer less than n, and R is a hydrophobic group of at least 8 carbon atoms and comonomer selected from non-ionic monomers and dialkylamino alkyl (meth)-acrylates or -acrylamides wherein at least one of the monomers is tertiary amine acid addition or quaternary ammonium salt. The resultant water soluble, high molecular weight, cationic polymers are useful as flocculants and as viscosifiers of aqueous acid solutions such as downhole acid stimulation fluids.

13 Claims, No Drawings

WATER SOLUBLE POLYMERS

This application is a continuation-in-part of application Ser. No. 766,097 filed Aug. 15, 1985, now U.S. Pat. No. 4,702,844.

The entire disclosure of U.S. application Ser. No. 766,097 filed Aug. 15, 1985 by the present applicants is herein incorporated by reference.

It is known that aqueous media can be thickened by the inclusion of higher molecular weight synthetic polymers in solution or swollen form and that improved results can be obtained in some instances by using a polymer having pendant hydrophobic groups. The improvement apparently is due to association between the hydrophobic groups in adjacent molecules and the polymers containing such groups are often referred to as associative polymers or associative thickeners.

The aqueous media often contain a dispersed phase and if the molecular weight of the thickener (conventional or associative) is too high the thickener will tend to cause flocculation. The molecular weight is therefore conventionally held to below about 1 million or intrinsic viscosity below about 1.5. Typical disclosures of associative thickeners of such molecular weight are in EP 11806 and EP 13836, which describe oil-in-water emulsions of anionic associative polymers which become soluble upon the addition of alkali.

Brine thickeners of rather high molecular weight are mentioned in U.S. Pat. No. 4,463,151. Associative polymers that function as suspending agents for dispersions are described in EP 3235 and it is implied that their molecular weight is lower than conventional. Certainly it cannot be higher than normal as otherwise it would flocculate the dispersions.

Typical other disclosures of associative polymers are to be found in GB No. 1,167,524 and 1,273,552, U.S. Pat. Nos. 3,915,921, 4,138,381, 4,190,562, 4,268,641, 4,384,096 and 4,423,199, EP 109820 and JP 60-235815A.

In practice the associative polymers have been anionic, generally consisting of copolymers of a non-ionic associative mononer with an anionic monomer, or a blend of anionic and non-ionic monomers. Although amino-containing monomers are mentioned as comonomers in EP 3235 the only example of their use is in the free base form in combination with a substantial amount of methacrylic acid (example 9), whereas all the other examples describe polymers formed solely from mixtures of associative monomers with anionic and/or non-ionic monomers.

Certain N-substituted acrylamide polymers are described in EP 48094 and 63018.

There are many environments in which known polymeric thickeners are unsatisfactory. In particular known associative polymers are unsatisactory in many acidic environments, especially those that are substantially free of suspended particulate material.

Aqueous suspensions of organic or inorganic particles are often flocculated by the inclusion of high molecular weight organic polymeric flocculants and, as explained in Ser. No. 766,097, now U.S. Pat. No. 4,702,844 there is a need in many instances for new polymers giving improved results as flocculants under certain conditions.

We now provide novel polymers that are water soluble, substantially linear, polymers having single point intrinsic viscosity (IV) greater than 3 and that are copolymers of two or more ethylenically unsaturated monomers and in which the polymers are cationic and the monomers from which they are formed include at least 0.5% by weight of monomer that carries a pendant hydrophobic group.

Preferred polymers according to the invention are water soluble, substantially linear, polymers having single point intrinsic viscosity above 3 and that are copolymers of (a) 1 to 90% by weight ethylenically unsaturated monomer containing the pendant hydrophobic group and (b) 99 to 10% by weight of at least one water soluble ethylenically unsaturated comonomer and in which at least one of the monomers from which the polymer is formed is a tertiary amine acid addition or quaternary ammonium salt.

The monomers of the invention are of particular value in aqueous acidic media as flocculants and as viscosifiers. They can be used, generally with beneficial improvements, in many situations where, prior to the invention, conventional non-associative cationic synthetic polymers would previously have been considered for use as flocculant or viscosifier.

The polymers of the invention generally have a molecular weight well above about 2 million. The single point intrinsic viscosity of the polymers must be above about 3 dl/g and is preferably above about 5, often being 7 to 12 or above. Intrinsic viscosity is normally measured in 3M sodium chloride at 25° C. and throughout this specification all IV values are, unless the context requires otherwise, single point intrinsic viscosities as measured, in dl/g, at 0.05% polymer concentration.

The polymers of the invention are substantially linear and thus preferably consist of an unbranched backbone carrying pendant groups including the hydrophobic groups. Small amounts of branching or other non-linearity, for instance as occurs spontaneously without deliberate addition of significant amounts of cross linking agent, can be tolerated but should be as low as possible and generally no deliberate addition of cross linking agent is made. In particular, the polymers must be substantially linear in the sense that any chain branching or other non-linearity is insufficient to render them water insoluble. However the non-linearity in the polymers may be sufficient to reduce the water solubility of the polymers if the molecular weight is too high. Under these circumstances it is desirable to maintain the molecular weight to a value that is sufficiently low to avoid insolubilisation of the polymers but sufficiently high that IV is above about 3 and the polymers have the molecular weights required for them to be effective as, for example, flocculants or thickeners. It may therefore be desirable to conduct the polymerisation in the presence of an amount of mercaptan or other chain transfer agent that is sufficient to hold the molecular weight down to levels at which the polymer is soluble but insufficient to hold the molecular weight down to the values that are typical of conventional associative polymers and that are below about IV=3 dl/g.

The polymers can be made by conventional polymerisation methods designed to provide substantially linear polymers of the desired high molecular weight from ethylenically unsaturated monomers. It is possible to make the polymers from monomers such that the polymers are water soluble only when some or all of the cationic groups have been converted to salt form after polymerisation (e.g., by oil-in-water emulsion polymerisation) but preferably the polymers are made initially in water soluble form from a water soluble blend of monomers, and most preferably all the monomers are water soluble. Thus the polymers are preferably made by reverse phase polymerisation or by bulk aqueous solution or gel polymerisation.

One convenient way of designing a process for making polymers according to the invention of the desired high molecular weight is to adapt an existing process that gives the desired molecular weight merely by replacing part of the monomer with monomer that provides the pendant hydrophobic groups. For instance a known process for making a copolymer of the chosen conventional monomers (typically dialkylamino alkyl (meth) acrylate esters and acrylamide) to a particular high IV value can be adapted to provide a copolymer for use in the invention of similar IV value simply by replacing part of one of the monomers with an equivalent amount of monomer that provides the pendant hydrophobic groups, all other conditions remaining unchanged. Thus the polymers of the invention can be made using conventional initiators and conventional polymerisation conditions designed to give the desired high molecular weight.

The polymers may be supplied as dispersions of polymer particles in oil (for instance as made by reverse phase polymerisation, usually using an amphipathic polymeric stabiliser, optionally followed by dehydration and with the optional addition of a oil-in-water emulsifier) or they may be provided in solid form, for instance as a result of comminuting and drying a gel of the polymer in the same way as conventional gel polymers are dried and comminuted.

The polymer is generally formed from (a) 1 to 90% by weight of ethylenically unsaturated monomers containing the pendant hydrophobic groups and (b) 10 to 99% by weight ethylenically unsaturated monomers free of the hydrophobic groups, i.e. from conventional ethylenically unsaturated monomers. Often the amount of conventional monomers is from 50 to 95% by weight and the amount of monomers containing hydrophobic groups from 2 to 50%. The amount of monomer (a) is usually at least 3%, often 3 to 10%, by weight. The preferred amounts of (b) and (a) are generally 75 to 95% and 5 to 25% by weight respectively.

The monomers free of hydrophobic groups are generally acrylic monomers. They may be non-ionic, for instance acrylamide or methacrylamide, or cationic, or blends of non-ionic and cationic. Suitable cationic monomers are dialkylamino alkyl (meth) acrylates and dialkylamino alkyl (meth) acrylamides. Some, and generally substantially all, the amine groups are preferably present as soluble salts, either acid addition or quaternary salts.

It is essential in the invention that the polymers are cationic and so the monomers must include cationic groups and, in particular, tertiary amine acid addition or quaternary ammonium salt groups.

The cationic group can be provided by the monomer carrying the hydrophobe. For instance the polymer may be a copolymer of acrylamide or other non-ionic, water soluble, monomer with a cationic monomer carrying the hydrophobe, for instance a quaternary ammonium compound wherein a hydrocarbyl group (e.g., stearyl) is attached to a quaternary or tertiary salt nitrogen atom. Often it is preferred for some or all of the cationic group to be provided by monomer (b) and so preferred cationic polymers of the invention can be formed from non-ionic monomer (a) and monomer (b) which is either a cationic monomer or a blend of cationic and non-ionic monomers. For instance it may be dialkylamino alkyl (meth) -acrylate or -acrylamide, wholly or mainly in the form of an acid addition or quaternary salt, optionally mixed with acrylamide. Suitable amounts are 1 to 90% by weight monomer (a), 10 to 99% by weight cationic monomer (b), and 0 to 80%, preferably 20 to 70%, acrylamide or other non-ionic monomer. Suitable amounts are 5 to 50%, 20 to 70% and 20 to 70% respectively.

The monomer (a) is preferably an ethylenically unsaturated monomer including a group $—B_nA_mR$ where A is propoxy or butoxy, B is ethoxy ($CH_2CH_2O$), n is zero or, preferably, a positive integer above 2 and generally above 5, often above 10 and preferably 20 to 100 and m is generally zero but, if n is a positive number, m can be a smaller positive number. Thus a polyoxyethylene chain may be interrupted by oxypropylene groups. By appropriate choice of the value of n, m, and the group R it is possible to control the solubility of the monomer and the properties of the final polymer.

R is a hydrophobic group containing at least 8 carbon atoms. It can be a polyoxyalkylene chain where the alkylene groups wholly or mainly are propylene or higher but preferably is a hydrocarbyl group.

The hydrocarbyl group generally contains from 8 to 30, preferably 10 to 24 and most preferably 12 to 18 carbon atoms. It may be selected from alkyl, for instance octyl, lauryl or stearyl, alkaryl such as ethyl benzene ($—C_2H_4Ph$), aryl such as naphthyl, aralkyl such as alkyl phenyl wherein the alkyl group generally contains 6 to 12 carbon atoms, cycloalkyl (including polycyclic alkyl groups), or mixtures of one or more such groups. Preferred hydrocarbyl groups are alkyl and aralkyl groups. Any of these groups may additionally be substituted provided the substituents do not render the pendant group hydrophilic to an extent that the desired improvement in properties due to the hydrophobic group is lost.

The monomer may be a (meth) acrylic or (meth) allylic monomer. The linkage between the ethylenically unsaturated carbon atom of the monomer and the group $—B_nA_mR$ is generally a chain of at least two, and often at least four atoms and often includes one or more amide, amine, ether or ester groups within the chain. The monomer may be di or polyfunctional, e.g., a derivative of itaconic acid, in which event both acid groups may be substituted by $—B_nA_mR$ or one may be unsubstituted or substituted by a different esterifying group, for instance methyl or higher alkyl, e.g., butyl.

Preferred monomers are (meth) allylic ethers and amides or esters of ethylenically unsaturated carboxylic acids preferably acrylamide acrylic acid, methacrylic acid, maleic acid or itaconic acid. In esters, the group may be bonded direct to the carboxylic group of the ethylenically unsaturated acid or may be bonded to an esterifying group that may include an amino group or one or more ether or ester linkages. For instance the group R may be a quaternising group in, for instance, the amino group of an amino alkyl esterifying group. In amides the group $—B_nA_mR$ may be bonded to a nitrogen atom of the amide or may be bonded to the nitrogen atom of an aminoalkyl group bonded to amide nitrogen, for instance as a quaternising group. Preferably the monomer (a) is a compound formed by reacting allyl chloride or alcohol or an appropriate ethylenically unsaturated acid or nitrile with a surfactant, preferably a hydroxyl terminated surfactant, preferably having HLB above 8.

Preferred monomers (a) are compounds of the formula $$R^1CH=C(R^2)QB_nA_mR$$

where $R = C_8-C_{30}$ alkyl or aralkyl, $R^1 = COOR^3$ or $QB_nA_mR$ when $R^2 = H$ and $Q \neq CH_2O$ or $R^1 = H$ $R^2 = H$ or $CH_3$ or $R^2 = CH_2COOR^3$ and $Q \neq CH_2O$ $R^2 = CH_2QB_nA_mR$ and $Q \neq CH_2O$ $R^3 = H$ or $C_1-C_8$ alkyl $Q = O$ when $R^1$ and $R^2 = H$ or $Q = CH_2O$, $COO$ or $CONR^4$ where $R^4 = H$ or $CH_3$, or $COOR^5N^+(R^3)_2.R.X^-$ where $R^5 = C_1-C_8$ alkyl optionally substituted by hydroxyl, e.g., $$CH_2-CH-CH_2$$
$$|$$
$$OH$$

and $X^- =$ anion, e.g., $Cl^-$ $Br^-$ or $CH_3SO_4^-$ or, when n, m=O, $Q=CONR^4(R^5)N^+(R^3)_2 X^-$ where $R^3$, $R^4$, $R^5$, and $X^-$ are as above; or $COO(R^5)OOC$ or $COO(R^5)COO$ where $R^5$ is as above; or $COO(R^5)OOC(R^5)N^+(R^3)_2.X^-$ or $COO(R^5)COO(R^5)N^+(R^3)_2.X^-$ where R, $R^3$, $R^5$ and $X^-$ are as above. A suitable example of RX that can be used for quaternising is stearyl chloride.

The (meth) allyl ethers are particularly preferred and give polymers having a particularly good combination of performance, rheology, linearity and stability properties during use. It is very surprising that they are so good since all the recent developments in associative polymers including hydrophobic groups have used acrylic monomers and the allyl polymers proposed in GB Nos. 1,167,524 and 1,273,552 appear to have been unsuccessful commercially, possibly because of the form in which they were produced.

The allyl ethers may be made by, for instance, reacting an appropriate surfactant alcohol with sodium or sodium alkoxide to form the sodium derivative and then reacting this with allyl chloride, or by reacting allyl alcohol with the surfactant alcohol with or without a catalyst, preferably as described in EP 213800.

Compounds in which Q includes $COOR^5COO$ may be made by reacting, e.g., acrylic acid with a hydroxycarboxylic acid followed by esterification with surfactant alcohol, or by reacting a hydroxyalkyl ester of acrylic acid with the half ester of for example succinic anhydride with a surfactant alcohol. Compounds in which Q includes $COOR^5OOC$ may be made by forming a half ester of a dicarboxylic acid and a surfactant alcohol, and reacting this, an unsaturated acid and a diol.

All the other described monomers are described in the quoted patents or can be obtained by routine methods.

When the compound is to have a quaternary group including the hydrocarbyl group, the quaternisation can be effected on the appropriate monomer before polymerisation or an unquaternised polymer may be formed, from conventional water soluble monomers, and this may then be quaternised with a quaternising agent, for instance that provides the desired hydrocarbyl group.

The novel cationic polymers of the invention can be used for, for instance, viscosifying acidic electroplating fluids, descaling fluids and rust inhibitor solutions. They are of particular value as viscosifiers for thickening acid stimulation fluids in the downhole oil recovery industry. They will be used in effective viscosifying amounts, typically in the range 0.1 to 5%, most preferably 0.3 to 3% by weight polymer based on dry solids. The aqueous fluids in which they are used should be substantially free of dispersed solids since the polymers will tend to cause flocculation of solids.

The cationic polymers are also of particular value as flocculants. The amount of polymer may desirably be greater, e.g., by 10 to 30%, than the amounts conventionally used with conventional flocculants. Suitable doses are in the range 0.01 to 3%, often 0.5 to 3%, by weight polymer based on dry solids of the dispersion.

Prior to using the polymers of the invention an aqueous solution may be formed by conventional methods. For instance the solution may be aged for at least 30 minutes after blending the polymer with water to permit the polymer to achieve a constant level of hydration before using the solution, e.g., as a flocculant solution.

When the polymers are used as flocculants, the suspension that is to be flocculated may be a suspension in water of organic or inorganic particles, but is preferably a sewage sludge.

The invention has the advantage that the flocculated suspension is much more tolerant to physical or chemical effects that would have bad consequences on flocculated suspensions that had been flocculated using conventional highly soluble and linear polymers. For instance conventionally it is necessary to select the amount of flocculant very carefully since if too little or too much is added flocculation performance, for instance as demonstrated by floc size, is greatly inferior compared to the floc size at the optimum doze. Generally only a very narrow range of dosages is optimum. In the invention floc size is less dose dependent and higher dosages can be added without risk of worse flocculation performance due to reduced floc size.

If the suspension is of variable metal or other ion content variations in this content can have significant effects on the flocculation performance. For instance the dosage of conventional flocculant may be optimised for a suspension but if the iron content of that suspension varies with time (as will frequently happen with industrial-based effluents) the dosage may no longer be optimum and may be either inadequate to cause flocculation or may be an overdose. In the invention however variation in iron or other ionic content of the suspension has much less effect on the flocculation properties.

A further advantage of the invention is that it is usually possibly to obtain floc size that is much greater than is obtainable using conventional, highly water-soluble, flocculants. Because, at the optimum dose, the floc size is much greater than is available conventionally this again means that the dose can be varied above or below the optimum whilst still obtaining improved results compared to those obtainable conventionally.

The invention is of particular value when the flocculated suspension is subjected to shear either as a preliminary to or during dewatering, or during some other process, and accordingly preferred processes of the invention include the application of shear to the flocculated suspension, often prior to or during dewatering of the suspension. Flocs formed with conventional linear flocculant polymers have low stability to shear and when they are sheared they break down into small fines that cannot easily be reflocculated into the flocs. For instance if conventional flocculated dispersions are sheared this results in the formation of a large proportion of fines that do not easily reflocculate within the dispersion and that cannot easily be separated from the liquid phase of the dispersion. Thus dewatering is poor. In the invention however it is possible to obtain flocs which are much more shear stable and, as mentioned, are larger. Upon applying shear these flocs may be broken down in size but they are broken down primarily to smaller, shear stable, flocs in preference to the unwanted fines obtained using conventional flocculants. Accordingly, even though the floc size is reduced, the dewatering and other properties of the flocculated dispersion are still satisfactory, and are much better than those obtainable with conventional flocculants.

One situation in which the shear stability of the flocs is very valuable is in dewatering that is performed under shear, and in particular centrifugal dewatering.

Another process where the shear stability of the flocs is valuable is when the flocs are to be maintained for a prolonged period in an agitated liquid medium, for instance in a chemical reaction vessel.

Another process where the shear stability of the flocs is very valuable is in the formation of paper and paper products such as board, since the processes of the invention permit improved dewatering of cellulosic and other suspensions. In conventional paper production it is generally necessary to minimise the amount of shear to which the flocs are subjected and so in practice the flocculant is added at the end of the pulp flow line, as late as possible before the drainage or other dewatering stage. In the invention however it is possible, and frequently desirable, to add the flocculant at an early stage in the pulp flow line so that the act of pumping the flocculated dispersion along the flow line towards the drainage or other dewatering stage involves the application of shear to the flocculated pulp, and this shear converts the flocs to medium or small size flocs substantially free of undesirable fines. A preferred process of the invention therefore comprises flocculating a cellulosic suspension with the defined flocculant, and pumping the flocculated suspension along a flow line with sufficient shear to break down the flocs to smaller, shear stable, flocs and then dewatering the suspension by drainage or other suitable means. This process is of particular value when cationic starch is also added to the dispersion since the overall process then gives an exceedingly good combination of paper strength and retention and dewatering properties. For this process the flocculant polymer is preferably an anionic polyacrylamide. Synergism appears to exist.

The invention is of particular value in the centrifugal dewatering of municipal sewage that includes a significant industrial component, especially that includes variable amounts of iron.

The polymers are also of particular value for filtration or other dewatering of mineral slurries.

In filtration and other processes of dewatering sewage sludges or other suspensions the performance of the defined polymers can be equivalent to conventional polymers of much higher molecular weight.

The following are examples of the invention.

EXAMPLE 1

A novel copolymer C containing 33.5 parts by weight acrylamide, 62.5 parts methyl chloride quaternised dimethylaminoethyl acrylate (QDMAEA) and four parts N-substituted acrylamide—20 mole ethoxylate $C_{13}-C_{15}$ alkyl monomer was prepared by a 43% aqueous gel polymerisation. The monomer solution was initiated from 0° C. at pH 3.5 using 12 ppm potassium bromate 24 ppm sodium sulphite and 100 ppm 4,4' azobis-4-cyanovaleric acid.

The resultant gel was cut into 3.5 mm pieces, dried at 80° C. and ground to a fine powder. The polymer was completely water soluble at 1% and had a single point intrinsic viscosity of 8.9 dlg$^{-1}$.

A copolymer, D, of 37.5% acrylamide and 62.5% QDMAEA.MeCl was prepared under identical conditions. Its single point intrinsic viscosity was determined as 8.8 dlg$^{-1}$.

The two products were tested as sewage sludge dewatering aids on a digested primary activated sludge (from Rotherham Sewage Works) containing 0.5M sodium chloride. The results of the capillary suction times (CST) for the two polymers is shown in Table 1.

TABLE 1

| Product | C.S.T. (seconds) Dosage @ 80 gm$^{-3}$ | 60 gm$^{-3}$ | Performance Index |
|---|---|---|---|
| C | 34 | 57 | +28 |
| D | 121 | 147 | −116 |
| Comparative polymer E | 54 | 71 | 0 |

The performance index is the mean of the values of $$100 - \frac{CSt_{ex} \cdot 100}{CST_E}$$

for each dosage level, where CSTex is the CST of the product being tested and $CST_E$ is the CST of comparative polymer E, which is 37.5/62.5 acrylamide/QDMAEA IV=12.0 dlg$^{-1}$ It can be seen that the copolymer C is more effective than both the copolymer D prepared under the same conditions and a product of much higher molecular weight, E.

EXAMPLE 2

A novel copolymer F comprising by weight 55 parts of acrylamide, 40 parts of acryloxyethyl trimethyl ammonium chloride and 5 parts of a diester of itaconic acid formed from a 10 mole ethoxylate of stearyl alcohol was prepared by reverse phase polymerisation and dehydrated by azeotropic distillation to form a dispersion of polymer in oil containing 50% polymer. Conventional materials and process conditions were used, for instance using stabiliser as in BP No. 1482515 and process conditions as in EP 126528.

A copolymer G was formed by the same process but without the itaconate.

The floc size was assessed visually. On a scale of 1 (largest) to 6 (smallest) the copolymer G gave a floc size of 3 at doses of about 30 to 40 g/m$^3$ but the floc size decreased rapidly with lower or smaller doses. With the copolymer F the floc size was larger (i.e., a size of from 2 to 3) at doses of from about 140 to 250 g/m$^3$ and deteriorated only gradually with higher or lower doses. This demonstrates that a better floc structure is obtainable from the copolymer of the invention, and the flocculation is much less sensitive to overdosing.

EXAMPLE 3

A copolymer of $\beta$-acryloxyethyl trimethyl ammonium chloride (42 parts), acrylamide (53 parts) and the allyl ether of a 10 mole ethoxylate of stearyl alcohol was formed by reverse phase polymerisation by the method given in example 4 of Ser. No. 766,097. The intrinsic viscosity of the copolymer was 5.9 dl. gm$^{-1}$ and its flocculation performance on Rotherham sewage sludge was compared with a 42/58-$\beta$-acryloxyethyl trimethyl ammonium chloride/acrylamide copolymer of in trinsic viscosity 12.4 dl. gm$^{-1}$ and found to be similar at the same polymer dose level, despite the large difference in IV.

EXAMPLE 4

Dimethylamino propyl methacrylamide may be dissolved in methanol and then quaternised by addition of stearyl chloride. The methanol may then be removed by evaporation and the quaternised monomer may then be dissolved in water with acrylamide to form a monomer solution. This may then be subjected to gel polymerisation in conventional manner to form a high molecular weight, water soluble, flocculant in which the quaternising group provides the hydrophobe.

EXAMPLE 5

A copolymer, J, was prepared from an aqueous monomer solution comprising 30 parts acrylamide, 70 parts methylchloride quaternised dimethylaminoethyl methacrylate, 0.66 parts EDTA Na$^+$ salt, 2.7 parts adipic acid, 1.19 parts of a 10% aqueous solution of 2-mercaptoethanol and 69 parts water. The solution was adjusted to pH 4.6 with NaOH solution prior to addition of the cationic monomer.

The aqueous phase was homogenised into an oil phase comprising 11.10 parts of a 30% solution in SBP 11 of a 2:1 molar copolymer of cetostearyl methacrylate and metharylic acid, 5.6 parts of a 53% solution of an hydroxystearic acid/glycol condensate in SBP 11, 130 parts of Pale Oil 60, 4.16 parts of a 1% slurry of AZDN in SBP 11 and 78 parts SBP 11.

The resulting monomer dispersion was deoxygenated and polymerised using 1.66 parts of a 1% solution in water of t-butyl hydroperoxide and a 0.1% aqueous solution of sodium metabisulphite added at a rate of 0.28 parts per minute until the full exotherm had occurred. External heating was then applied and the mixture was held at 80° C. for 1 hour. Water was then removed at 95° C. under reduced pressure.

The resulting dehydrated polymer in oil dispersion was rendered water dispersible by the addition of 5 parts of mixed non-ionic surfactants per 100 parts of product.

A terpolymer, K, having a similar high molecular weight, was prepared by the same process when 10 parts of an acrylic acid ester of a 20 mole ethoxylated stearyl alcohol was used in place of 10 parts acrylamide.

The products as made were then used to thicken 15% HCl solution. The resulting viscosities at differing polymer concentrations (% by weight) were measured using a Fann Viscometer and are given in the table below.

| Product | Concen-tration | Fann Viscosity (cP) | | | |
|---|---|---|---|---|---|
| | | 600 rpm | 300 rpm | 200 rpm | 100 rpm |
| J | 1.5 | 7.5 | 8.5 | 9.0 | 10.5 |
| K | 1.5 | 51 | 78 | 104 | 165 |
| | 1.0 | 24 | 34 | 42 | 63 |
| | 0.5 | 9 | 10 | 12 | 15 |

The viscosities of the 1% and 0.5% solutions of J were too low to measure.

This data shows clearly that the terpolymer of the invention is a more effective viscosifier for aqeuous acidic solutions than a comparable copolymer free of the hydrophobic groups.

EXAMPLE 6

Polymer L was prepared from 30 parts acrylamide and 70 parts methyl chloride quaternised dimethylamino ethyl methacrylate by the same technique as in example 5 except that only 0.34 parts of a 10% aqueous solution of 2-mercaptoethanol was included in the initial monomer solution and 0.34 parts per minute of a 0.1% aqueous solution of 2-mercaptoethanol was added continuously throughout the polymerisation. The mercaptoethanol feed was halted when polymerisation was complete, prior to the distillation under reduced pressure.

A terpolymer M was produced by the same procedure except that 10 parts of an acrylic acid ester of a 20 mole ethoxylated stearyl alcohol was used in place of 10 parts acrylamide.

The IV of copolymer L was 4.8 and the IV of copolymer M was 5.7 dl/g: We believe that the molecular chain length of the two polymers would have been similar.

The products were then evaluated according to the procedure given in Example 5. The results obtained are given in the table below.

| Product | Concen-tration | Fann Viscosity (cP) | | | |
|---|---|---|---|---|---|
| | | 600 rpm | 300 rpm | 200 rpm | 100 rpm |
| L | 1.5 | 20 | 25 | 29 | 36 |
| | 1.0 | 12 | 15 | 17 | 21 |
| | 0.5 | 6 | 7 | 8 | 9 |
| M | 1.5 | 45 | 62 | 74 | 99 |
| | 1.0 | 27 | 35 | 41 | 54 |
| | 0.5 | 10 | 13 | 15 | 17 |

Again, the terpolymer of the invention was formed to be a much more effective viscosifier than an equivalent copolymer.

We claim:
1. A water soluble, substantially linear, polymer having a single point intrinsic viscosity of at least about 3 and that is a copolymer of
(a) 1 to 90% by weight ethylenically unsaturated monomer that includes a group —B$_n$R where B is ethoxy, n is an integer of 2 to 100 and R is a hydrocarbyl group of 8 to 0 carbon atoms, and
(b) 99 to 10% by weight of at least one water soluble, ethylenically unsaturated comonomer selected from dialkylamino alkyl (meth) -acrylates an -acrylamides, including acid addition and quaternary ammonium salts thereof, and water soluble nonionic monomers, and in which the monomers from which the polymer is formed include 10 to 99% by weight of tertiary amine acid addition or quaternary ammonium salt monomer.

2. A polymer according to claim 1 formed from 1 to 90% by weight of monomer (a), 0 to 80% by weight (meth) acrylamide and 10 to 99% by weight cationic monomer selected from dialkylamino alkyl (meth) -acrylates and -acrylamides, wherein the cationic monomer is in the form of a salt selected from acid addition and quaternary ammonium salts.

3. A polymer according to claim 1 in which monomer (a) containing the said group $-B_nR$ is selected from an ethylenically unsaturated amide substituted on the amide nitrogen atom by the said group, a (meth) allyl ether with the said group, and an ester formed between an ethylenically unsaturated carboxylic acid and the said group.

4. A polymer according to claim 1 in which monomer (a) has the formula $CH_2=CH'CH_2OB_nR-$ where $R'$ is hydrogen or methyl, n is 5 to 100, and m, B and R are as defined in claim 1.

5. A polymer according to claim 1 in which R contains 8 to 30 carbon atoms and is selected from alkyl, aryl, aralkyl and cycloalkyl.

6. (a) polymer according to claim 1 in which the amount of monomer A is 2 to 50% by weight.

7. A polymer according to claim 1 in which n is an integer from 10 to 100.

8. A polymer according to claim 1 in which monomer (b) comprises dialkylamino alkyl (meth) acrylate quaternary ammonium salt.

9. A polymer according to claim 1 in which monomer (b) comprises acrylamide in an amount of 20 to 70% by weight.

10. An aqueous acidic solution that is substantially free of suspended particulate material and that is thickened by the inclusion therein of a thickening amount of a polymer according to claim 1.

11. A polymer according to claim 1 having a molecular weight above 2 million.

12. A polymer according to claim 1 having an intrinsic viscosity above 5.

13. A polymer according to claim 1 having an intrinsic viscosity between 7 to 12.

* * * * *

UNITED STATES PATENT AND TRADEMARK OFFICE
CERTIFICATE OF CORRECTION

PATENT NO. : 4,940,763

DATED : JULY 10, 1990

INVENTOR(S) : PETER FLESHER ET AL

It is certified that error appears in the above-identified patent and that said Letters Patent is hereby corrected as shown below:

Claim 1, Col. 10, Line 64, change "0" to --- 30 ---; Claim 4, Col. 11, Line 22, change "$CH_2=CH'CH_2OB_nR$" to --- $CH_2=CR'CH_2OB_nR$ ---; Claim 6, Col. 12, Line 4, Change "(a)" to --- A ---; Claim 6, Col. 12, Line 5, Change "A" to --- (a) ---.

Signed and Sealed this

Twenty-fifth Day of August, 1992

Attest:

DOUGLAS B. COMER

Attesting Officer

Acting Commissioner of Patents and Trademarks